Jan. 7, 1958  R. R. PROCTOR ET AL  2,819,092
HYDRAULIC SNUBBING DEVICE RESPONSIVE TO SPEED
FOR VEHICLE STEERING MECHANISM
Filed Oct. 12, 1955

INVENTORS
RONALD R. PROCTOR
BY  ALBERT H. ARENS

Edward H. Lang

ATTORNEY

United States Patent Office 2,819,092
Patented Jan. 7, 1958

2,819,092

HYDRAULIC SNUBBING DEVICE RESPONSIVE TO SPEED FOR VEHICLE STEERING MECHANISM

Ronald R. Proctor and Albert H. Arens, Crystal Lake, Ill., assignors to The Pure Oil Company, Chicago, Ill., a corporation of Ohio Application October 12, 1955, Serial No. 540,007

3 Claims. (Cl. 280—90)

The present invention relates to a hydraulic power steering system for motor vehicles which includes an automatic, controlled reduction of mechanically or hydraulically applied power which is continuously variable with increase in speed of the motor vehicle. More particularly, the invention relates to a speed-controlled, by-pass-valve, safety arrangement, within an auxiliary hydraulic snubber to be associated with a mechanical or power steering unit, which prevents sudden oversteering at high speeds and provides for continuously variable reduction in the amount of sudden power available to the steering mechanism with increase in speed of the automobile.

Accordingly, a principal object of the invention is to provide a snubber system cooperating with a steering mechanism for a motor vehicle which automatically and continuously varies and controls the magnitude of sudden mechanically or hydraulically applied power to the steering mechanism in proportion to the speed of the automobile.

Another object of the invention is to provide a by-pass-valve-controlled feed line to an hydraulic snubber unit which is operated by the speed of the vehicle.

Another embodiment of the invention and object thereof comprises a centrifugal governor connected to the vehicle transmission to control the magnitude of hydraulic power applied to either side of a subber piston cooperating with the steering mechanism. Further, it is contemplated that a magnetic clutch may be connected to the voltage and ignition system of the engine in suitable manner to control the magnitude of the hydraulic power applied to the snubber piston.

The principal object of the invention is to provide a speed-sensitive hydraulic snubber for automobile steering gears which may be used in conjunction with power-steering units or with motor vehicles utilizing mechanical steering linkages.

Many modern motor vehicles are equipped with power-steering units in which hydraulic pressure, generated by a pump driven by the engine of the car, is applied to a system of pistons and levers in such a manner as to assist the operator of the vehicle in turning the steering mechanism. Such power-steering devices are of particular advantage in overcoming steering resistance at low speed or during parking of the vehicle where slow-speed maneuvering is necessary.

However, this additional power applied to the steering mechanism can be dangerous during high-speed operation on highways. It is known that accidents have been caused at high speeds by oversteering or overcontrolling the front wheels on the impulse of the moment when a danger threatens the vehicle and the operator. There is created an apparent necessity for a device which will automatically reduce the amount of hydraulic power applied to the steering mechanism as the speed of the vehicle increases, so that at speeds of about 50 M. P. H. or above the assistance provided by the power-steering mechanism is at a minimum, and the driver of the vehicle encounters practically the full resistance of the steering mechanism and is not likely to oversteer or overcontrol in the event of an emergency. With the increasing number of inexperienced drivers and the increased horsepower of the modern vehicle, it becomes essential that some means be provided to prevent a motor vehicle from virtually "stubbing its toe" over a suddenly turned front wheel, and/or causing dangerous skids or upsets due to a quickly turned steering wheel under high-speed conditions. There have been instances where the front suspension of a motor vehicle has been literally crushed beneath the car because of this oversteering phenomenon.

On the other hand, there are driving conditions under which it is desirable to have full power steering at all times during high speed operation. An example would be cross-country driving against a strong cross-wind, or the sudden strong drag on the wheel or wheels as the vehicle leaves the hard surface of the pavement and goes off into a soft or muddy shoulder of the road bed. It is known that under these conditions power steering units have an inherent snubber action and tend to overcome this sudden drag on the wheels. However, accidents have occurred because the driver over-steered under these conditions and caused the car to return to the road too suddenly. Therefore, it becomes essential that any reduction in power steering energy that is made be not only gradual and proportional to speed but that a snubber action be applied to prevent oversteering and "toe-stubbing."

In order to more distinctly define the invention, reference is made to the drawings in which.

Figure 1:
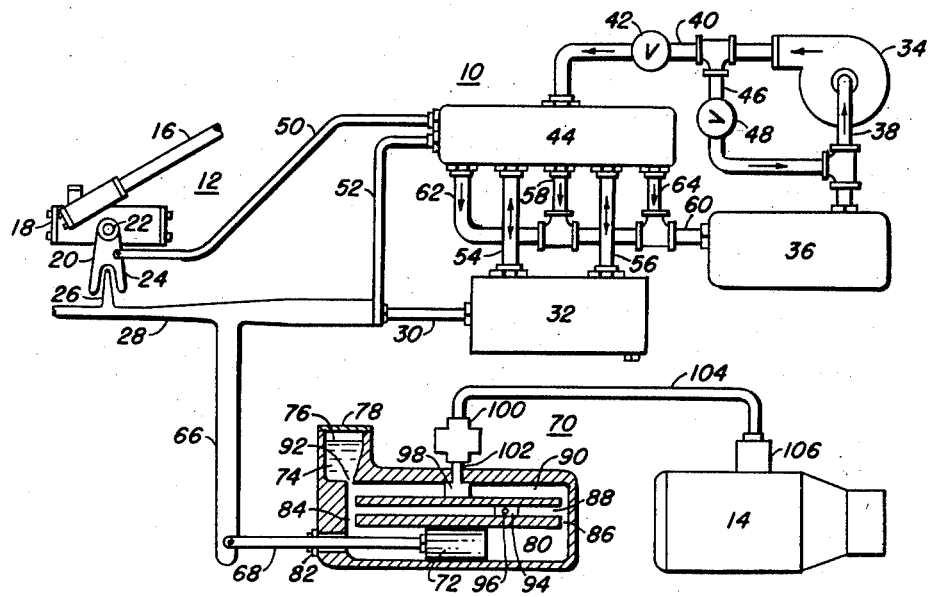
Figure 1 is a diagrammatic view of the general assembly which includes this invention.

Referring to Figure 1 there is shown in diagram form a power steering unit 10 connected to the mechanical steering linkage of an automobile having transmission 14. Steering linkage 12 comprises steering wheel shaft 16 connected to gear box 18 which houses the helical and sun gear arrangement generally used to transform the rotational motion of shaft 16 to a back-and-forth motion of steering arm 20 pinioned to shaft 22. Steering arm 20 has a yoke 24, the arms of which are on opposite sides of and spaced slightly from contact arm 26 extending upwardly from steering linkage 28. Steering linkage 28 is connected at one end to shaft 30, which is connected to the piston within hydraulic motor 32. The other end of steering linkage 28 connects with the pull rods (not shown) operating the front wheels of the vehicle.

Power steering unit 10 has pump 34, which withdraws hydraulic fluid from reservoir 36 through line 38 and forces the fluid under pressure through line 40, controlled or adjusted by valve 42, into control valve 44. By-pass 46 controlled by one-way check valve 48 is provided to convey excess hydraulic pressure from the pressure side of pump 34 back to line 38 during idling or other periods of non-use of the power steering unit when the engine is running. Control valve 44, under the influence of control linkage 50, connected between steering arm 20 and a sleeve valve (not shown) within control valve 44, and in cooperation with control linkage 52, connected between steering linkage 28 and a piston (not shown) within control valve 44, allows the passage of varying amounts of hydraulic fluid through line 54 and 56 into hydraulic motor 32. Excess hydraulic fluid continuously flows through connecting line 58 into return line 60 back to reservoir 36. Similarly, excessive oil not passing to or returning from motor 32 passes into return line 60 by means of connecting lines 62 and 64.

It is seen from this general description that movement of steering column 16 will cause yoke 20 to engage arm 26 and thus mechanically move the front wheels through steering linkage 28 with power unit 10 shut off. With the power unit actuated, as by opening valve 42, the movement of yoke 20 causes steering linkage 28 to move carrying control linkage 52 in the same direction. This opens lines 54 and 56 and the piston within motor 32 moves linkage 28 and arm 26 so it is not contacting the arms of yoke 24. As the mechanism comes to the end of the turning radius of the wheels, or as the direction of motion of yoke 24 is changed, linkage 50 in cooperation with linkage 52 shuts off the subsidiary and main parts, respectively, of valve 44 to stop or change the motion correspondingly. In actual operation, power unit 10 keeps arm 26 out of contact with the arms of yoke 24 during the main portion of the travel from right-to-left or left-to-right of the yoke during steering operations. The main power for the motion of steering linkage 28 comes from motor 32 actuated through valve 44 controlled by linkages 50 and 52. With the hydraulic power off, yoke 24 again takes over in actual contact with arm 26 and the work needed for steering comes from shaft 16 and the steering wheel. This completes the description of both the mechanical and power steering operations with which hydraulic snubber 70 cooperates.

The aforementioned back and forth motion of steering linkage 28, carries arm 66 therewith. Arm 66 is connected to piston rod 68 attached to piston 72 of snubber unit 70, shown in cross section. Snubber unit 70 has hydraulic oil reservoir 74, oil supply 76, cover 78 and cylinder 80 in which piston 72 operates. A suitable gasket and bushing arrangement is provided at 82 around the piston rod 68. Snubber 70 has several conduits 84, 86, leading from each end of cylinder 80, and conduits 88 and 90 parallel to each other and connecting between conduits 84 and 86. Conduit 84 is restricted at 92 where it enters reservoir 74. Conduit 88 has control valve 94 therein having screw 96 for adjusting the orifice. Conduit 90 is fitted with control valve 98 to which is connected control unit 100 through connecting linkage 102. control unit 100 operates through connection 104 from adapter 106 attached to transmission 14.

The adjusting screw, 96, on valve 94 may take the form of a screw accessible from the outside of snubber unit 70 so that adjustments can be made and set with a screw driver. Valve 94 is a non-closing valve and is adjustable to the various required orifice openings as needed for different weights of vehicles. Valve 94 is adjusted so that in the normal steering of the vehicle, as maneuvering at speeds up to 30 miles per hour or parking, the relatively slow back-and-forth motion of piston 72 offers little resistance to arm 66 and linkage 28. Under these conditions valve 98 will be open and the main flow of fluid 76 under the motion of piston 72 will be through conduit 90 which is slightly larger than conduit 88.

During high speed operation from about 40 to 90 miles per hour, control 100 begins to close valve 98, the flow of fluid through conduit 90 is restricted and the sudden motion of piston 72 and steering linkage 28 is impeded or snubbed, when the latter is operated either mechanically or with the aid of power steering unit 10. Accordingly, even though the steering wheel may be turned suddenly, calling for quick response from the power unit 10, or a sudden thrust is given to steering linkage 28 through a bump in the road or a soft shoulder, the responsiveness and amount of actual turning will be reduced in proportion to the vehicle speed. This action does not interfere with the slow turning of the wheels or normal turning thereof after the shock has passed.

Figure 2:
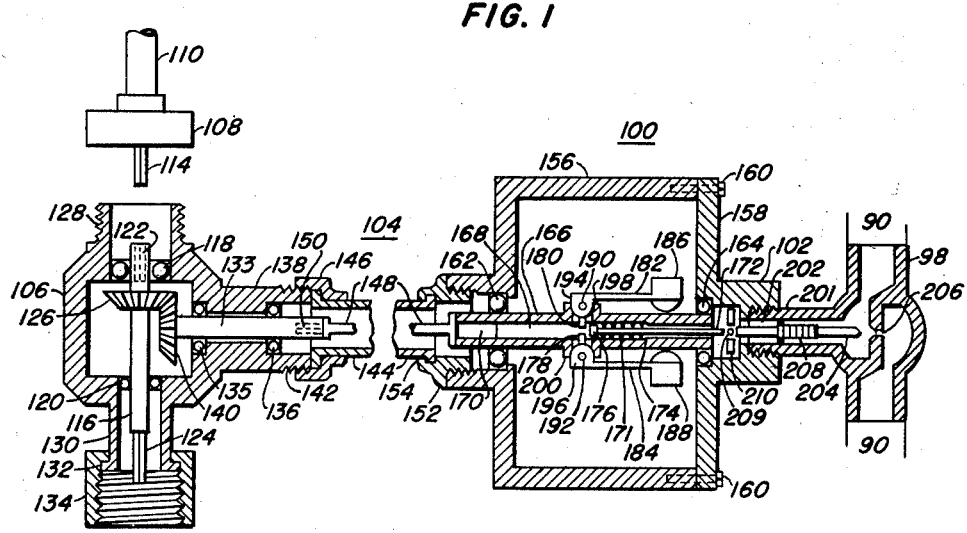
Figure 2 is a cross sectional exploded view of the component parts of one form of control unit which may be applied in accordance with the invention and includes a centrifugal, governor-operated, needle-valve and an adapter for connection with the speedometer cable from a transmission of the motor vehicle.

Referring to Figure 2, an exploded cross-sectional view of a preferred embodiment of the invention, there is shown the relationship between transmission 14, adaptor 106, connection 104, control unit 100 and connecting linkage 102 with valve 98 in conduit 90. The ordinary speedometer cable adaptor 108 connected to cable 110, which attaches to threaded neck 112 extending from the transmission, is connected through adaptor 106. Speedometer cable 110 terminates in square tip 114 which conventionally engages and is rotated by a moving part (not shown) within the transmission. Adapter 106 houses shaft 116 which is supported by thrust bearings 118 and 120. Shaft 116 has square recess 122 adapted to receive and engage square tip 114 of speedometer cable 110. The other end of shaft 116 carries square tip 124 adapted to engage a moving part within the transmission. Bevel gear 126 is splined or otherwise attached to shaft 116.

Adaptor has threaded end-portion 128 which engages the inside threads of cable adaptor 108. The lower portion of adaptor 106 extends as housing 130 having lip 132 which engages coupler 134 for attachment of the adaptor to threaded neck 112 holding square end 124 in engagement within the transmission. Operation of the motor vehicle with adaptor 106 attached thereto causes no interruption of the operation of speedometer cable 110 through the linkage arrangement and cooperation of parts just described.

Adaptor 106 carries a second shaft, 133, perpendicular to shaft 116 and supported by thrust bearings 135 and 136 within housing 138. On one end of shaft 133 is attached bevel gear 140 which engages bevel gear 126. These two bevel gears may be of the same or different diameter so that the speed of rotation of shaft 133 will be at the same speed as, faster than, or slower than shaft 116. Housing 138 has portion 142 which engages connection 104. Connection 104 leads from the adaptor and transmission to control unit 100 and may be in the form of a flexible housing (144) held to adaptor housing 138 by coupler 146 engaging threaded end 142 and surrounding flexible shaft 148. Square tip 150 of flexible shaft 148 engages a square recess in the end of shaft 133. Flexible housing 144 has coupler 152 with internal lip 154 engaging the flared end of housing 144.

Control unit 100 is a centrifugal, governor-type control. The housing of control unit 100 is composed of two parts, body 156 and plate 158, which has extension 102 attaching to valve 98. Plate 158 is held to body 156 by any suitable means. Bolts 160 may serve this purpose. Body 156 and plate 158 hold thrust bearings 162 and 164 in alignment to carry shaft 166. One end of shaft 166 has square opening 168 to engage square tip 170 of shaft 148. Opening 168 extends through shaft 166 forming a housing for spring 171 and pin 172. Spring 171 rests against shoulder 174 of opening 168 at one end, and against collar 176 on pin 172. The end of pin 172 is thrust against arms 178 and 180 extending inwardly from governor arms 182 and 184. The governor arms carry balanced weights 186 and 188, respectively, and are pivoted on pins 190 and 192 extending through bearing portions 194 and 196. The bearing portions have curved surfaces resting in cups 198 and 200. Two governor arms are shown, but more than two or even one governor arm may be used.

As hollow shaft 166 is rotated by flexible shaft 148, weights 186 and 188 are thrown outward therefrom causing arms 182 and 184 to pivot on pins 190 and 192. This action causes arms 178 and 180 to press on the end of pin 172, and spring 171 is compressed. This action also causes the gradual closing of packless needle valve 98 controlling flow through passage 90. Valve 98 is attached to extension 102 by threaded housing 201. This housing has opening 202 in which needle 204 operates to control hole 206. Needle 204 is surrounded by bellows 208 attached at one end to needle 204, and at the other end to housing 201, forming a flexible seal which prevents leakage of fluid from passage 90 into opening 202. Since hollow shaft 166 is rotating and pin 172 is free to rotate therewith, a ball bearing, 209, held within the center of washer 210 is provided for proper contact of rotating pin 172 and non-rotating needle 204.

An example of the operation of the device so far described is as follows: Assume that power steering unit 10 is in full operation, and in complete control of steering linkage 28. The vehicle speed approaches 45 miles per hour and is accelerating. Transmission 14, through adaptor 106 and connection 104, begins to increase the centrifugal force on weights 186 and 188 to the point where valve 98 is partially closed. This increases the resistance to shock offered by piston 72 and prevents sudden over-steering by means of power unit 10. It does not prevent the normal or gradual turning of the steering wheel to negotiate curves or turn out for passing slower moving vehicles. Valve 94 is adjusted so that movement of piston 72 is not entirely impeded, and at the high traveling speed, the resultant slowing down of the movement of steering linkage 28 is a delayed action, being most apparent under a sudden thrust of the steering wheel or sudden shock experienced against the steering linkage 28, as through passage of a front wheel into a hole in the road or onto a soft shoulder.

What is claimed is:

1. A snubber unit for attachment to the steering linkage of a wheeled vehicle comprising, in combination, a housing encompassing a cylinder with a piston operating therein, said piston having a piston rod extending outside said housing, means to connect said piston rod to said steering linkage, a liquid passageway leading from one end of said cylinder and communicating with the other end of said cylinder, a first variable-orifice valve controlling liquid flow through said liquid passageway, a liquid reservoir communicating with said liquid passageway, a valve-controlled by-pass around said valve, a second variable-orifice valve controlling liquid flow through said by-pass, said second variable-orifice valve controlling the sudden movement of said steering linkage by impeding the movement of liquid in said by-pass passageway.

2. A snubber unit in accordance with claim 1 in which said second variable-orifice valve is a needle valve having a sealed movable needle therein, the movement of said needle being controlled by a speed-responsive unit operating from the transmission of said vehicle, said speed-responsive unit comprising a housing attached to the housing of said needle valve, a rotatable hollow shaft within said housing, one end of said hollow shaft attaching to a flexible shaft coupling, a push rod slidably mounted in said shaft, balanced levers pivotally mounted on said shaft, said levers being weighted on one side of the pivotal mounting, said levers on the other side of said pivotal mounting bearing against one end of said push rod, the other end of said rod adapted to bear against and force said needle into closed position, a spring to maintain said push rod against said levers, said flexible shaft coupling being connected to a rotating part of said transmission so as to rotate in fixed relation to said part, whereby change in speed of said part correspondingly changes the pressure of said levers on said push rod and results in opening and closing of said needle valve.

3. A snubber unit in accordance with claim 2 in which said flexible shaft coupling is connected to a rotating part of said transmission through an adapter, said adapter comprising a housing having a rotatable shaft therein, one end of said shaft being connected to a rotating part of said transmission, a bevel gear mounted on said shaft, a second rotatable shaft within said housing, said second shaft being mounted in the same plane as said first shaft and vertical to same, a second bevel gear on said second shaft, said second bevel gear meshing with said first bevel gear, said bevel gears being of the same diameter so that the speed of rotation of said shafts is the same, and said flexible coupling is connected to said second rotatable shaft.

References Cited in the file of this patent
UNITED STATES PATENTS 2,191,125    Collins _____ Feb. 20, 1940

FOREIGN PATENTS 231,629    Switzerland _____ July 1, 1944

U. S. DEPARTMENT OF COMMERCE
PATENT OFFICE

CERTIFICATE OF CORRECTION

Patent No. 2,819,092　　　　　　　　　　　　　　January 7, 1958

Ronald R. Proctor et al.

It is hereby certified that error appears in the printed specification of the above numbered patent requiring correction and that the said Letters Patent should read as corrected below.

Column 1, line 41, for "subber" read --snubber--; column 3, line 45, for "control" read --Control--; column 4, line 16, after "Adaptor" insert --106--.

Signed and sealed this 4th day of March 1958.

(SEAL)
Attest:
KARL H. AXLINE

Attesting Officer

ROBERT C. WATSON
Commissioner of Patents